United States Patent [19]

Brandenberg

[11] 4,216,799

[45] Aug. 12, 1980

[54] SEQUENTIAL AND FLUID LOGIC DEVICE

[75] Inventor: Karl A. Brandenberg, Chehalis, Wash.

[73] Assignee: The Aro Corporation, Bryan, Ohio

[21] Appl. No.: 967,293

[22] Filed: Dec. 7, 1978

[51] Int. Cl.³ .................... F16K 11/04; F16K 31/126
[52] U.S. Cl. ............................................. 137/625.66
[58] Field of Search .................................. 137/625.66

[56] References Cited

U.S. PATENT DOCUMENTS 3,385,322  5/1968  Brandenberg .................. 137/625.66

Primary Examiner—Gerald A. Michalsky
Attorney, Agent, or Firm—Allegretti, Newitt, Witcoff & McAndrews

[57] ABSTRACT

A sequential AND fluid logic device has a first input (a) and a second input (b) with a single output (c). An output signal results whenever the input signals are provided sequentially to the first input (a) and the second input (b). The device includes a body member with a throughbore. An actuator is placed into the throughbore for cooperation with a first seat at one end of the throughbore. A diaphragm is arranged in opposed relation to the actuator and cooperates with the actuator. Another seat is cooperative with a poppet member at the opposite end of the throughbore. The area associated with the first seat is less than the active area associated with the diaphragm which, in turn, is less than the area associated with the other seat to assure sequential operation of the device.

3 Claims, 4 Drawing Figures

SEQUENTIAL AND FLUID LOGIC DEVICE

BACKGROUND OF THE INVENTION

In a principal aspect the present invention relates to a fluid logic device and more particularly to a sequential AND.

It is often desirable to provide a sequential logic system to control pneumatically operated equipment for example. Various fluid logic devices have been proposed and are disclosed in prior publications, e.g. Bouteille, Fluid Logic Devices, John Wiley and Sons. Additionally, many patents have issued which teach various devices and systems including the patent to Brandenberg for an AND device, U.S. Pat. No. 3,385,322, issued May 28, 1968.

Fluid logic systems which provide for sequential operations such as flip-flop systems are very complex if conventional control hardware and techniques such as disclosed in Bouteille and the Brandenberg patent referenced above are utilized. Complex systems such as disclosed in the prospective patent application identified by Ser. No. 63,923 filed Aug. 6, 1979, entitled "Multiple Element Fluid Logic Controls", Brandenberg, inventor, require a multitude of logic elements in order to provide the desired sequential operation. To reduce the number of logic elements in such systems therefore, sequential fluid logic devices become desirable.

One of the desired fluid logic elements useful in sequential systems is a sequential AND device. Such a device would include a first input (a) and a second input (b) as well as an output (c). An output signal would be provided only in the event of a proper sequence of signals to the inputs (a) and (b).

SUMMARY OF THE INVENTION

The apparatus of the present invention comprises a selective AND fluid logic device having a first input (a), a second input (b) and a single output (c) wherein an output signal is provided by output (c) whenever input signals are provided sequentially to the first input (a) followed by a signal to the second input (b) and subsequently sustained. The device includes a body member with a throughbore. An arrangement of valve seats are defined at the opposite ends of the throughbore. An actuator, diaphragm, and poppet cooperate with the seats of the throughbore to insure a sequential relationship between the switching of the input and the output.

Thus, it is an object of the present invention to provide a sequential AND fluid logic device.

A further object of the present invention is to provide a sequential AND fluid logic device which is easy to manufacture and includes a minimum number of moving parts.

Still a further object of the present invention is to provide a sequential AND fluid logic device which may be utilized for controlling air operated tools and equipment.

A further object of the present invention is to provide a sequential AND fluid logic device which is reliable and economical.

These and other objects, advantages and features of the invention will be set forth in the detailed description which follows.

BRIEF DESCRIPTION OF THE DRAWING

In the detailed description which follows reference will be made to the drawing comprised of the following figures.

DESCRIPTION OF THE PREFERRED EMBODIMENT

Figure 1:
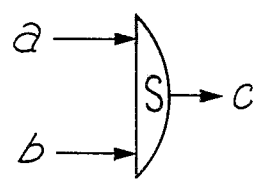
FIG. 1 is the symbol for the sequential AND device.

FIG. 1 illustrates a symbol for the sequential AND of the present invention. The symbol is substantially identical to the AND symbol associated with non-sequential devices as illustrated at 10 in FIG. 4. However, the letter "S" has been added to the prior art AND symbol 10.

Typically in a standard AND device, the output (c) is "on" only if the inputs (a) and (b) are both "on". The sequence of operation of inputs (a) and (b) is not important. Such a typical prior art AND device is illustrated in Brandenberg U.S. Pat. No. 3,385,322 which is incorporated herein by reference.

With a sequential AND device as schematically symbolized in FIG. 1, the sequence of signals becomes important. Thus, an output signal (c) is provided only if an input (a) occurs first, followed by a signal at input (b). The signals at (a) and (b) must therefore be sequential and must persist before an output is provided at (c). For this reason, the device is designated a sequential AND device.

Figure 2:
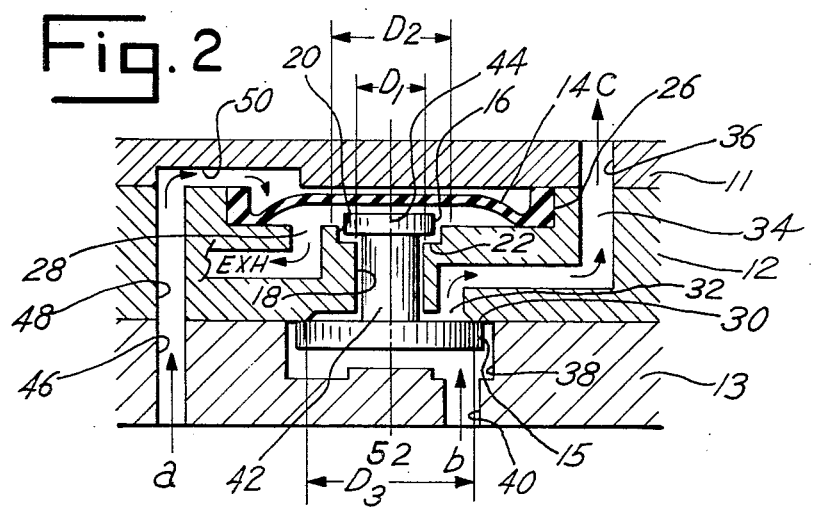
FIG. 2 is a cross sectional view of the improved sequential AND device of the present invention.

Referring not to FIG. 2, the device is illustrated in cross section in greater detail. A main body member 12 is sandwiched between a cover plate 11 and a base 13. A diaphragm 14, poppet 15 and actuator 16 are positioned within the body member 12 as described below to provide the sequential AND function.

Thus, body member 12 includes a throughbore 18 having a counterbore 20 at one end thereof to define a first seat 22. A flexible diaphragm 14 is received within a cavity 26 in the body member 12 for cooperation with head 44 of actuator 16. The area associated with the first seat 22 represented by the diametrical symbol D1 is less than the active area of the diaphragm 14 represented by diametrical symbol D2. An exhaust passage 28 adjacent the throughbore 18 is defined in the body member 12 on the underside of the diaphragm 14. The exhaust passage 28 flows from the region beneath the diaphragm 14 to the atmosphere.

The opposite end of the throughbore 18 defines a seat 30 which has an area represented by diametrical symbol D3. This area is greater than the areas associated with seat 22 and active area of diaphragm 14. A recess 32 adjacent the seat 30 in the body member 12 connects with outlet passage 34 in body member 12 which extends through outlet passage 36 in cover plate 11.

A disc shaped poppet 15 is retained in opposed relation to seat 30 within a cavity 38 defined in base 13. The poppet 15 thus cooperates with seat 30 to seal input passage 40 associated with input (b) in base 13.

Actuator 16 includes a stem 42 projecting through the throughbore 18. The diameter of the cylindrical stem 42 is less than that of the throughbore 18 so that fluid may pass through the throughbore 18. A flanged head 44 of actuator 16 cooperates with first seat 22 to seal the throughbore 18. Head 44 also cooperates with diaphragm 14. The stem 42 extends for a distance greater than the length of the throughbore 18 in order to engage poppet 15 and transport poppet 15 from the seat 30 when head 44 is seated on first seat 22.

Input (a) is defined by inlet passage 46 in base 13 connected with passage 48 in body member 12 and passage 50 in cover plate 11 which, in turn, is connected with the side of the diaphragm 14 opposite the actuator 16.

The apparatus or device illustrated in FIG. 2 is generally symmetrical about a longitudinal axis 52 through the center of the actuator 16. The diaphragm 14, actuator 16, poppet 15, and throughbore 18 are, therefore, generally cylindrical and have axis 52 as a common axis.

Figure 3:
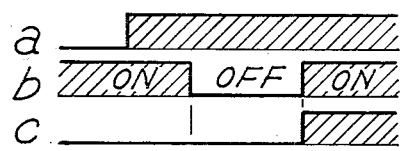
FIG. 3 is a graphical representation of the operation of the sequential AND device of FIG. 2.

The operation of the device shown in FIG. 2 is understood by reference to FIG. 3. FIG. 3 is a graph illustrating the existence of input and output signals through the ports (a), (b) and (c) shown in FIG. 2. The shaped portions of FIG. 3 illustrate the existence of a signal. Thus, if a signal exists at input (b) and a signal is subsequently and sequentially provided at input (a), there will be no signal through the output (c). If the input (b) is subsequently switched "off", the signal at output (c) will remain "off". Then if the input (b) is subsequently switched "on" in a sequence which follows the "on" signal through the input (a), an output signal is provided at output (c). In terms of the operation of the device shown in FIG. 2, if a signal is provided at input (a) through passage 46 against diaphragm 14 before a signal is provided at input (b) through passage 40, the diaphragm 14 will act against the actuator 16 thereby unseating poppet 15 from the seat 30. A subsequent signal through the input (b) at passage 40 flows about the poppet 15 and through the output passage 34 and output (c).

If, however, the input signal through passage 40 in input (b) arrives first, the poppet 15 is seated on seat 30. A subsequent signal through passage 46 against diaphragm 14 will be unable to unseat the poppet 15 from the seat 30 because of the area relationships described above. Thus, the seat area associated with seat 30 is greater that the active area associated with the diaphragm 14. The ratio of areas as described is a very important feature of the invention in order to accomplish the sequential operation desired.

Figure 4:
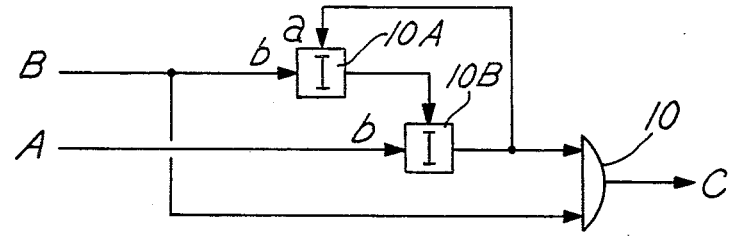
FIG. 4 is a circuit diagram illustrating the prior art configuration of fluidic devices equivalent in function to the device of the present invention.

FIG. 4 illustrates the combination of logic devices of the type shown in Brandenberg U.S. Pat. No. 3,385,322 and Brandenberg U.S. Pat. No. 3,389,720, both incorporated herewith, required to provide a circuit equivalent to the sequential AND described above. Thus, the AND device 10 described in U.S. Pat. No. 3,385,322, coupled with two inhibiter or NOT devices 10A and 10B, as described in Brandenberg U.S. Pat. No. 3,389,720, would be required in the configuration shown in FIG. 4 to provide a sequential AND device wherein the sequence of input signals in inputs (a) and (b) would be determinative of whether an output signal is provided at output (c).

Various modifications of the invention are possible. Thus, the invention is to be limited only by the following claims and their equivalents.

What is claimed is:

1. A sequential AND fluid logic device having a first input (a), a second input (b) and an output (c) wherein an output signal is provided by output (c) whenever input signals are provided and sustained sequentially to the first input (a) and then the second input (b), said device comprising, in combination:
   a body member, with a throughbore, said throughbore having a counterbore at one end to define an exhaust seat having a first area ($A_1$);
   a diaphragm, one side of the diaphragm being in communication with the first input (a) and having an active area $A_2$;
   an opposite end of the throughbore having a supply seat with a still larger area ($A_3$) whereby $A_3 > A_2 > A_1$;
   an exhaust passage on the underside of the diaphragm;
   an actuator valve having a first valve member cooperative with the exhaust seat;
   a poppet for cooperation with the supply seat, said first valve member and poppet being spaced from each other by a rod which is longer than the distance between the exhaust and supply seats; and
   a passage connected to an active side of the poppet and defining the input (b), and a passage from the opposite side of the poppet defining the output (c).

2. A sequential AND fluid logic device having a first input (a), a second input (b) and an output (c) wherein an output signal is provided through output (c) whenever input signals are provided sequentially and sustained to the first input (a) and then the second input (b), said device comprising, in combination:
   a platelike body member having a throughbore with a counterbore at one side of the throughbore to define a first counterbore seat having a first area ($A_1$); a diaphragm having a larger active area ($A_2$); the opposite end of the throughbore defining a supply seat having a still larger area ($A_3$), said supply seat surrounding the throughbore and a passage for output (c);
   a poppet disc in opposed relation with the supply seat;
   a base plate for cooperation with the body member and for retaining the poppet disc in cooperation with the supply seat; said base plate including a passage for second input (b);
   an actuator having a stem projecting through the throughbore for cooperation with the poppet disc and a flanged valve member for cooperation with the first seat ($A_1$) said stem being longer than the throughbore whereby only the poppet or the valve member are seated, said stem being shaped to permit air flow between the stem and throughbore; said diaphragm being cooperative with the actuator;
   an exhaust passage in the body member under the diaphragm; and
   a cover over the diaphragm cooperative with the body member, said cover including an input passage for first input (a).

3. The device of claim 2 wherein said throughbore, diaphragm, actuator and poppet are generally cylindrical with a common axis.